(12) United States Patent
Umezawa et al.

(10) Patent No.: US 10,701,783 B2
(45) Date of Patent: Jun. 30, 2020

(54) DISPLAY DEVICE

(71) Applicant: NIPPON SEIKI CO., LTD., Niigata (JP)

(72) Inventors: Yukie Umezawa, Niigata (JP); Tamito Kawate, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/336,013

(22) PCT Filed: Sep. 12, 2017

(86) PCT No.: PCT/JP2017/032809
§ 371 (c)(1),
(2) Date: Mar. 22, 2019

(87) PCT Pub. No.: WO2018/061744
PCT Pub. Date: Apr. 5, 2018

(65) Prior Publication Data
US 2020/0029410 A1 Jan. 23, 2020

(30) Foreign Application Priority Data
Sep. 27, 2016 (JP) ................ 2016-188712

(51) Int. Cl.
*H05B 47/105* (2020.01)
*G02B 27/01* (2006.01)
*H04N 5/74* (2006.01)

(52) U.S. Cl.
CPC ........... *H05B 47/105* (2020.01); *G02B 27/01* (2013.01); *H04N 5/74* (2013.01)

(58) Field of Classification Search
CPC .... A63F 13/211; A63F 13/212; A63F 13/213; A63F 13/22; A63F 13/235; A63F 13/24;
(Continued)

(56) References Cited

U.S. PATENT DOCUMENTS

| 2012/0153837 A1* | 6/2012 | Park | H05B 45/22 315/151 |
|---|---|---|---|
| 2012/0286674 A1 | 11/2012 | Takanashi | |
| 2016/0335959 A1* | 11/2016 | Kuraishi | B60K 35/00 |

FOREIGN PATENT DOCUMENTS

| JP | 2010-230860 A | 10/2010 |
| JP | 2012-238721 A | 12/2012 |
| JP | 2014-066920 A | 4/2014 |

OTHER PUBLICATIONS

International Search Report issued in corresponding International Patent Application No. PCT/JP2017/032809, dated Nov. 28, 2017, with English Translation.

* cited by examiner

*Primary Examiner* — Nelson M Rosario
(74) *Attorney, Agent, or Firm* — McDermott Will & Emery LLP

(57) ABSTRACT

A display device includes: an illuminating unit having a light source unit emitting light; an illumination control unit controlling the illuminating unit; a display element forming an image using illuminating light from the illuminating unit; a display control unit controlling the display element; a control unit controlling the illumination control unit and the display control unit based on a video signal; and a detection unit detecting the output intensity of the light source unit at that time. The control unit stores a control value corresponding to a target output intensity of the light source unit, and based on a difference between the to target output intensity and the output intensity at that time, the control unit determines a correction value for correcting the control value, and based on a control correction value obtained by correcting the control value using the correction value, the illumination control unit drives the light source unit.

8 Claims, 7 Drawing Sheets

(58) Field of Classification Search
CPC .......... A63F 13/25; A63F 13/31; A63F 13/42; A63F 13/428; A63F 13/5255; A63F 13/53; A63F 13/80; A63F 13/92; A63F 2300/8082; F21V 23/0471; G01B 11/002; G01C 19/5776; G01D 5/26; G01J 1/44; H04N 13/239; H04N 13/246; H04N 13/254; H04N 13/204; H05B 45/10; H05B 47/105; H05B 47/11; H05B 47/19; G02B 2027/0138; G02B 2027/014; G02B 2027/0187; G02B 27/017; G02B 27/0172; G06F 2203/0382; G06F 3/011; G06F 3/012; G06F 3/017; G06F 3/0308; G06F 3/0325; G06F 3/033; G06F 3/0346; G06F 3/038; G06F 3/04815; G06T 2207/10021; G06T 2207/10152; G06T 2207/20076; G06T 2207/30244; G06T 7/70; G06T 7/248; G06T 7/285; G06T 7/73; G06T 7/74; G06T 7/80; G06T 7/85

See application file for complete search history.

DISPLAY DEVICE

CROSS REFERENCE

This application is the U.S. National Phase under 35 U.S.C. § 371 of international Application No. PCT/JP2017/032809, filed on Sep. 12, 2017, which claims the benefit of Japanese Application No. 2016-188712, filed on Sep. 27, 2016, the entire contents of each are hereby incorporated by reference.

TECHNICAL FIELD

The present invention relates to a display device that displays an image by a field sequential method, for example.

BACKGROUND ART

For example, PTL 1 discloses a display device, and the display device is provided with an illumination device, a light intensity detection unit, an illumination optical system, a display element, a projection optical system, a screen, a plane mirror, a concave mirror, a housing, and a light-transmissive unit. In the display device of PTL 1, the luminance of the illumination device can be changed in accordance with the luminance that is demanded of a display image displayed on the screen. Specifically, in the display device of PTL 1, as a driving method of a light source unit of the illumination device, for example, two driving methods are employed, and a combination of a control value (for example, duty ratio) necessary for the PWM driving method and a control value (for example, current value) necessary for the PAM driving method is changed to allow the luminance of the illumination device to be changed.

It should be noted that in the display device of PTL 1, a rate of a display period (period in which the display element can display the display image on the screen) within a frame period may be constant (for example, 50[%]), or may be determined in accordance with the luminance that is demanded of the display image (for example, 50[%] or 70[%]).

CITATION LIST

Patent Literature

PTL 1: JP-A-2014-066920

SUMMARY OF INVENTION

Technical Problem

PTL 1 suggests that light intensity data is acquired from the light intensity detection unit, and a gap between luminance that is demanded of the display image displayed on the screen and actual luminance of the illumination device (illuminating unit) is corrected, however, a specific method is not disclosed.

An object of the invention is to provide a display device that is capable of accurately control the luminance of an illuminating unit. Another object of the invention will be apparent for persons skilled in the art with reference to the aspects, the best mode, and the attached drawings, which are exemplified below.

Solution to Problem

Aspects according to the invention are exemplified below for easy understanding of an overview of the invention.

With a first aspect, a display device includes:
an illuminating unit that includes a light source unit capable of emitting light;
an illumination control unit that controls the illuminating unit;
a display element that is capable of forming a display image using illuminating light from the illuminating unit;
a display control unit that controls the display element;
a control unit that controls the illumination control unit and the display control unit on the basis of a video signal; and
a detection unit that detects a current output intensity of the light source unit,
in which,
the control unit stores therein a control value corresponding to a target output intensity of the light source unit,
the control unit determines, on the basis of a difference between the target output intensity and the current output intensity detected by the detection unit, a correction value for correcting the control value, and
the illumination control unit drives the light source unit on the basis of a control correction value in which the control value is corrected by the correction value.

In the first aspect, for example, when a target output intensity is set or changed in accordance with a change in the demanded luminance, a current output intensity corresponding to the target output intensity before being set or before being changed can be considered. Specifically, in the first aspect, how far the current output intensity is apart from the target output intensity after being set or after being changed can be considered. More specifically, in the first aspect, when the light source unit is driven at a control value corresponding to the target output intensity after being set or after being changed, the control value can be corrected by a correction value based on a distance from the current output intensity to the target output intensity. Accordingly, a current or actual output intensity after the driving is likely to match the target output intensity after being set or after being changed, so that it is possible to accurately control the luminance of the illuminating unit.

With a second aspect dependent on the first aspect,
when the target output intensity is lower than the current output intensity, the correction value may decrease the control value.

In the second aspect, when the current output intensity is lowered to the target output intensity after being set or after being changed, it is possible to drive the light source unit at a decreased control value. Specifically, when the control unit stores therein a control value corresponding to a target output intensity, the control unit can drive the light source unit at a control correction value corresponding to a target output intensity lower than the target output intensity after being set or after being changed. Generally, as the target output intensity is higher, the light source unit has a higher temperature, so that the present inventors have recognized that when the current output intensity is lowered to the target output intensity after being set or after being changed, the luminance of the illuminating unit is high due to the high temperature state of the light source unit. In the second aspect, when the current output intensity is lowered to the target output intensity after being set or after being changed, the light source unit is driven at the decreased control value, so that it is possible to accurately control the luminance of the illuminating unit.

With a third aspect dependent on the first or second aspect, when the target output intensity is higher than the current output intensity, the correction value may increase the control value.

In the third aspect, when the current output intensity is raised to the target output intensity after being set or after being changed, it is possible to drive the light source unit at an increased control value. Specifically, when the control unit stores therein a control value corresponding to a target output intensity, the control unit can drive the light source unit at a control correction value corresponding to a target output intensity higher than the target output intensity after being set or after being changed. Generally, as the target output intensity is lower, the light source unit has a lower temperature, so that the present inventors have recognized that when the current output intensity is raised to the target output intensity after being set or after being changed, the luminance of the illuminating unit is low due to the low temperature state of the light source unit. In the third aspect, when the current output intensity is raised to the target output intensity after being set or after being changed, the light source unit is driven at the increased control value, so that it is possible to accurately control the luminance of the illuminating unit.

With a fourth aspect dependent on any one aspect of the first to third aspects, as an absolute value of the difference between the target output intensity and the current output intensity detected by the detection unit is greater, an absolute value of the correction value may be greater.

In the fourth aspect, as a distance from the current output intensity to the target output intensity is apart farer, the light source unit is driven on the basis of a correction value significantly corrected in accordance with the distance, so that it is possible to accurately control the luminance of the illuminating unit.

With a fifth aspect dependent on any one aspect of the first to fourth aspects, when an absolute value of the difference between the target output intensity and the current output intensity detected by the detection unit is less than a threshold, the correction value may be zero, and the control correction value may be the control value corresponding to the target output intensity.

In the fifth aspect, when the distance from the current output intensity to the target output intensity is short, it is possible to omit correction of the control value, and drive the light source unit at the control value corresponding to the target output intensity.

With a sixth aspect dependent on any one aspect of the first to fifth aspects, the control unit may take in the current output intensity detected by the detection unit after having driven the light source unit on the basis of the control correction value, and may adjust the correction value such that the current output intensity matches the target output intensity.

In the sixth aspect, it is possible to take in the current output intensity, after the light source unit has been driven on the basis of the control correction value, preferably, take in the current output intensity in real time, and adjust the correction value on the basis of match or mismatch between the current or actual output intensity after the driving and the target output intensity after being set or after being changed.

With a seventh aspect dependent on any one aspect of the first to sixth aspects, the light source unit may include a plurality of light-emitting elements respectively having different light-emitting colors, the illumination control unit may control the illuminating unit by a field sequential method so as to drive the light-emitting elements individually for each of sub-frame periods obtained by temporally dividing a frame period of the image, the control unit may store therein the control value corresponding to the target output intensity for each of the light-emitting elements, and the control value may be based on a product of a duty ratio for PWM driving corresponding one light-emitting element of the plurality of light-emitting elements and a current value for PAM driving the corresponding one light-emitting element.

In the seventh aspect, in the display device using the field sequential method, it is possible to employ, as a control value corresponding to the target output intensity, for example, a product of a duty ratio and a current value when one light-emitting element is driven.

With an eighth aspect dependent on any one aspect of the first to seventh aspects, the detection unit may further detect a current temperature of the light source unit, and the control unit may determine the correction value on the basis of the difference between the target output intensity and the current output intensity, and the current temperature.

In the eighth aspect, when the correction value is determined, it is possible to further consider the current temperature of the light source unit. Accordingly, the current or actual output intensity after the driving is further likely to match the target output intensity after being set or after being changed, so that it is possible to further accurately control the luminance of the illuminating unit.

With a ninth aspect dependent on any one aspect of the first to eighth aspects, the control unit may store therein an assumed temperature of the light source unit that is associated with the control value, and the control unit may determine the correction value on the basis of the difference between the target output intensity and the current output intensity, the current temperature, a first assumed temperature that is associated with a current control value, and a second assumed temperature that is associated with a target control value corresponding to the target output intensity.

In the ninth aspect, when the correction value is determined by the assumed temperature of the light source unit being associated with the control value, it is possible to further consider the current temperature of the light source unit, the first assumed temperature that is current or before being changed, and the second assumed temperature after being set or after being changed. Accordingly, the current or actual output intensity after the driving is further likely to match the target output intensity after being set or after being changed, so that it is possible to further accurately control the luminance of the illuminating unit.

Persons skilled in the art can easily understand that the exemplified aspects according to the invention can be further changed without deviating the scope of the invention.

DESCRIPTION OF EMBODIMENT

A best mode described below is used for easy understanding of the invention. Accordingly, persons skilled in the art should be noted that the invention is not unduly limited by the embodiment described below.

Figure 1:
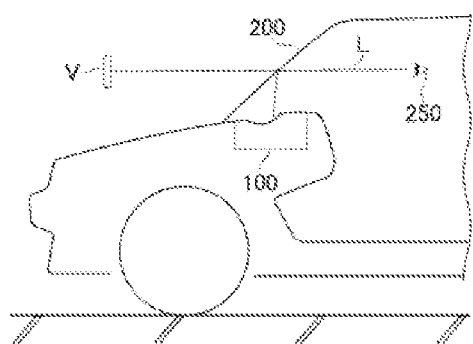
FIG. 1 is an explanation diagram of a display device in one usage purpose according to the invention.

FIG. 1 is an explanation diagram of a display device in one usage purpose according to the invention. In the example of FIG. 1, as a display device, for example, a head-up display device 100 is illustrated, and the head-up display device 100 is suitable for a vehicle that is an automobile, for example. The head-up display device 100 is provided in a dashboard of the vehicle, and causes display light L indicating a display image to reflect on a window shield 200, so that an occupant such as a vehicle driver 250 can visually identify, for example, a virtual image V of the display image indicating vehicle information.

Figure 2:
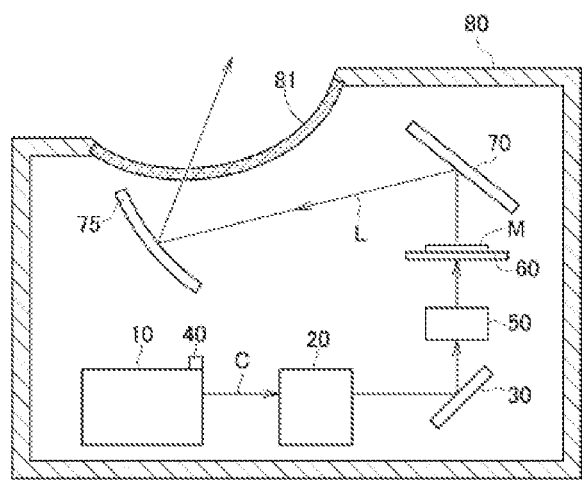
FIG. 2 is an explanation diagram of a display mechanism of the head-up display device in FIG. 1.

FIG. 2 is an explanation diagram of a display mechanism of the head-up display device 100 in FIG. 1. In the example of FIG. 2, the head-up display device 100 is provided with, for example, an illuminating unit 10, an illumination optical system 20, a display element 30, a detection unit 40, a projection optical system 50, a screen 60, a plane mirror 70, a concave mirror 75, and a housing 80 including a window unit 81 from which a display image M is emitted.

The illuminating unit 10 in FIG. 2 includes a light source unit 11 that is capable of emitting light (see FIG. 3), and for example, can further include a circuit substrate (not illustrated) on which the light source unit 11 is mounted, a reflection transmission optical unit (not illustrated), and a luminance non-uniformity reduction optical unit (not illustrated). The light source unit 11 is provided with, for example, a light-emitting diode 11r (a first light-emitting element, in a broad sense) that emits red light, for example, a light-emitting diode 11g (a second light-emitting element, in a broad sense) that emits green light, and for example, a light-emitting diode 11b (a third light-emitting element, in a broad sense) that emits blue light (see FIG. 3).

The illumination optical system 20 in FIG. 2 includes, for example, a concave lens or the like, and can adjust illuminating light C emitted from the illuminating unit 10 to the size of the display element 30. The display element 30 in FIG. 2 is, for example, a movable digital micro-mirror device (DMD) provided with a plurality of micro mirrors, and the respective micro mirrors are individually controlled. When the micro mirror is ON, the micro mirror is inclined +12 degrees, for example, using a hinge (not illustrated) as a support point, and can reflect the illuminating light C emitted from the illumination optical system 20 in a direction of the projection optical system 50. When the micro mirror is OFF, the micro mirror is inclined −12 degrees, for example, using the hinge as a support point, and cannot reflect the illuminating light C in the direction of the projection optical system 50.

The detection unit 40 in FIG. 2 can detect an output intensity of the light source unit 11 in the illuminating unit 10, and can preferably further detect the temperature of the light source unit 11. The projection optical system 50 in FIG. 2 includes, for example, a concave lens, a convex lens, or the like, and can irradiate with high efficiency the screen 60 with the display light L of the display image M projected from the display element 30. The screen 60 in FIG. 2 includes, for example, a diffusion plate, a holographic diffuser, a micro-lens array, and the like, and can receive the display light L from the projection optical system 50 on a lower surface of the screen 60, and display the display image M on an upper surface of the screen 60.

The plane mirror 70 in FIG. 2 can cause the display image M displayed on the screen 60 to reflect toward the concave mirror 75. The concave mirror 75 in FIG. 2 is, for example, a concave mirror or the like, and causes the display light L from the plane mirror 70 to reflect on the concave surface to emit reflection light toward the window unit 81. The display light L reaches the vehicle driver 250 in FIG. 1 via such a display mechanism, and the virtual image V that is recognized by the vehicle driver 250 has a size in which the display image M displayed on the screen 60 is enlarged.

Materials for the housing 80 in FIG. 2 are, for example, a hard resin and the like, and the window unit 81 having a prescribed size is provided on an upper part of the housing 80. A material for the window unit 81 is, for example, a translucent resin such as an acrylic, and the shape of the window unit 81 is a curved shape, for example. The window unit 81 can cause the display light L from the concave mirror 75 to pass therethrough.

Figure 3:
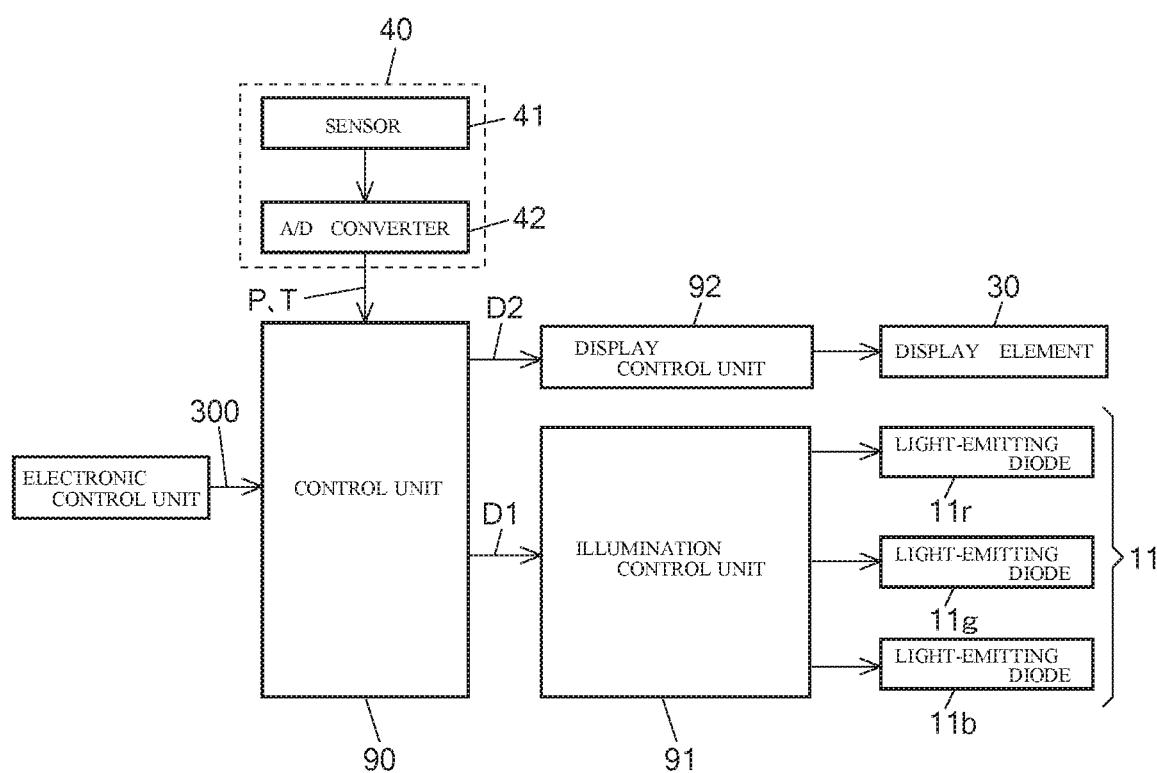
FIG. 3 illustrates a configuration example of the display device according to the invention.

FIG. 3 illustrates a configuration example of the display device according to the invention. In FIG. 1, the display device is illustrated as the head-up display device 100, and the head-up display device 100 is controlled by, for example, a control unit 90, an illumination control unit 91, and a display control unit 92 in FIG. 3. In the example of FIG. 3, an electronic control unit (ECU) can generate a video signal 300, and the control unit 90 can be input with the video signal 300 with communication by a low voltage differential signal (LVDS) method, for example. The control unit 90 typically includes, for example, a field programmable gate array (FPGA), but may include an application specific integrated circuit (ASIC), a micro computer, and the like. Moreover, the control unit 90, the illumination control unit 91, and the display control unit 92 may be configured as an integrated IC, for example.

The control unit 90 in FIG. 3 can output illumination control data D1 for controlling the illuminating unit 10 at the luminance of light and the light-emitting timing that are demanded by the video signal 300 to the illumination control unit 91, and output display control data D2 for forming the display image M that is demanded by the video signal 300 in the display element 30 to the display control unit 92. A frame F that is a cycle in which the display image M is displayed includes sub frames SF obtained by temporally dividing the frame F into a plurality (see FIG. 7), and the illumination control unit 91 in FIG. 3 can control the illuminating unit 10 by a field sequential driving method of causing the light-emitting diodes 11r, 11g, and 11b having different colors for every sub frame SF to be successively switched at high speed and at the light intensity and the timing that are demanded by the illumination control data D1.

The display control unit 92 in FIG. 3 can ON/OFF control, on the basis of the display control data D2, the respective micro mirrors in the display element 30 by a PWM method, for example, utilize the light-emitting diodes 11r, 11g, and 11b as basic colors when the illuminating light C that is emitted by the illuminating unit 10 is caused to reflect in a direction of the screen 60, and represent the display image M in color mixture or in full color by an additive mixture method. The detection unit 40 in FIG. 3 includes, for example, a sensor 41 that is a photo diode, and an A/D converter 42 that converts analog data into digital data, and can output intensity data P of the light source unit 11 to the control unit 90. The detection unit 40 is provided for each of the light-emitting diodes 11r, 11g, and 11b, and the sensor 41 can typically include three light intensity detection sensors.

Preferably, the detection unit 40 in FIG. 3 can also output temperature data T of the light source unit 11 to the control unit 90, and the sensor 41 can further typically include three temperature detection sensors corresponding to the three light-emitting diodes 11r, 11g, and 11b. It should be noted that the temperature data T of the light source unit 11 is, for example, an ambient temperature of the light-emitting diode or an LED chip, and the control unit 90 may calculate a junction temperature on the basis of the ambient temperature, a thermal resistance from the LED chip to a surrounding atmosphere, and input power.

Figure 4:
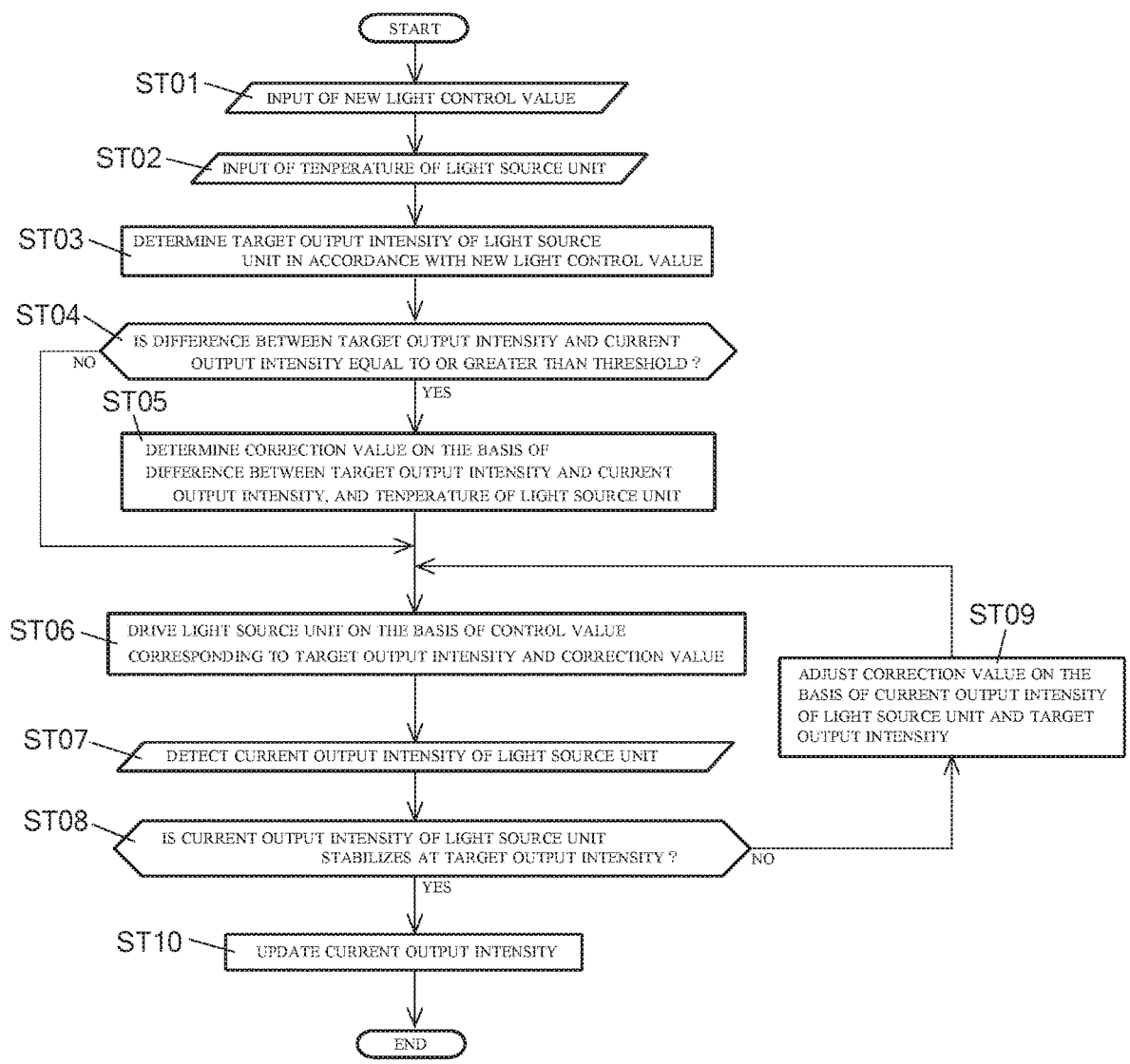
FIG. 4 illustrates a flowchart indicating an operation example of the display device in FIG. 3.

FIG. 4 illustrates a flowchart indicating an operation example of the display device in FIG. 3. For example, at Step ST01, the control unit 90 is input with a new light control value. Typically, a vehicle or the head-up display device 100 in FIG. 1 is provided with an illuminance sensor that detects the illuminance of external light such as the forward illuminance of the vehicle, and the control unit 90 can determine the luminance of light demanded by the video signal 300 in accordance with illuminance data. In other words, the new light control value is typically illuminance data, for example. Alternatively, the new light control value may be determined by, for example, the ECU in FIG. 3 or a not illustrated other ECU (vehicle-mounted device, in a broad sense), or may be determined by an operation of the vehicle driver 250.

After the new light control value is input, the control unit 90 is input with the temperature of the light source unit 11 (for example, the temperature of the light-emitting diode 11r that emits red light) (Step ST02 in FIG. 4). Next, the control unit 90 determines a target output intensity of the light source unit 11 (for example, target light intensity of the light-emitting diode 11r) in accordance with the new light control value (Step ST03). Next, the control unit 90 determines whether a difference between the set or changed target output intensity and a current output intensity is equal to or greater than a threshold (first threshold or intensity threshold) on the basis of the new light control value (Step ST04).

If the difference between the target output intensity and the current output intensity is equal to or greater than the threshold, the control unit 90 determines a correction value on the basis of the difference between the target output intensity and the current output intensity, and the temperature of the light source unit 11 (Step ST05). It should be noted that when the display device or the head-up display device 100 does not detect the temperature of the light source unit 11, Step ST02 is omitted, and the control unit 90 may determine a correction value on the basis of the difference between the target output intensity and the current output intensity at Step ST05.

Figure 5:
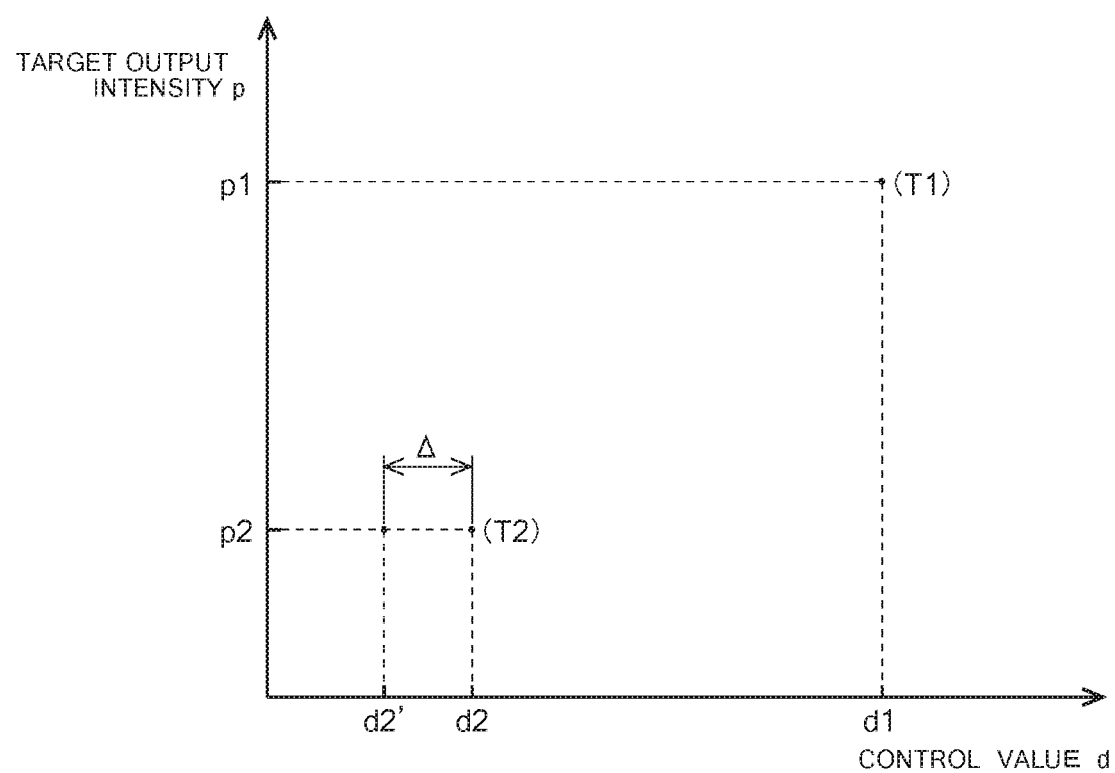
FIG. 5 is an explanation diagram of a correction value for correcting a control value corresponding to a target output intensity.

FIG. 5 is an explanation diagram of a correction value for correcting a control value corresponding to a target output intensity. The control unit 90 in FIG. 3 stores therein a control value corresponding to the target output intensity of the light source unit 11, and for example, control values corresponding to target output intensities p1 and p2 are respectively d1 and d2 (see FIG. 5). The relational expression as illustrated in FIG. 5 is set, for example, by considering an individual difference among the light-emitting diodes 11r, 11g, and 11b at the time of manufacturing. When a value of the target output intensity is changed from p1 to p2 in FIG. 5, for example, the control unit 90 can consider the current output intensity (Step ST05 in FIG. 4).

For example, it is assumed that current output intensity data P of the light-emitting diode 11r matches the target output intensity p1, and the illumination control unit 91 drives the light-emitting diode 11r at the control value d1. Specifically, the control unit 90 can consider how far the current output intensity (=p1) is apart from the target output intensity p2 after being set or after being changed. More specifically, when the illumination control unit 91 drives the light-emitting diode 11r at the control value d2 corresponding to the target output intensity p2 after being set or after being changed, the illumination control unit 91 can correct the control value d2 with an correction value Δ based on a distance (=p1−p2) from the current output intensity (=p1) to the target output intensity p2.

When the current output intensity (=p1) is lowered to the target output intensity p2 after being set or after being changed, the illumination control unit 91 can drive the light-emitting diode 11r at a decreased control value (=d2−Δ=d2'). In other words, the illumination control unit 91 can drive the light-emitting diode 11r at a control correction value d2' corresponding to a target output intensity lower than the target output intensity p2 after being set or after being changed. Generally, the light-emitting diode 11r has a higher temperature as the target output intensity p is higher, so that the present inventors have recognized that when the current output intensity (=p1) is lowered to the target output intensity p2 after being set or after being changed, the luminance of the light-emitting diode 11r that is driven at the control value d2 is high due to the high temperature state (amount of heat generation) of the light-emitting diode 11r. When the current output intensity (=p1) is lowered to the target output intensity p2 after being set or after being changed, the illumination control unit 91 in FIG. 3 drives the light source unit 11 including the light-emitting diode 11r at the decreased control value (=d2−Δ=d2'), so that it is possible to accurately control the luminance of the illuminating unit 10.

Preferably, as an absolute value of the difference between the target output intensity and the current output intensity is greater, a greater absolute value of the correction value is set. In other words, when the current output intensity (=p1) is lowered to a target output intensity (<p2) after being set or after being changed, the illumination control unit 91 can drive the light-emitting diode 11r at a further decreased control value (<d2'). As a distance from the current output intensity to the target output intensity is apart farer, the illumination control unit 91 drives the light source unit 11 on the basis of a correction value significantly corrected in accordance with the distance, so that the control unit 90 can further more accurately control the luminance of the illuminating unit 10.

It should be noted that in FIG. 5, the control value d is, for example, the driving power of the light-emitting diode 11 based on the product of a duty ratio that PWM drives one light-emitting element such as the light-emitting diode 11r and a current value that PAM drives the light-emitting diode

11*r*. As one example, when the duty ratio of the PWM driving is constant, the control value d is the driving current of the light-emitting diode 11. Alternatively, when the driving current is constant, the control value d is the duty ratio of the PWM driving.

For example, it is assumed that the current output intensity data P of the light-emitting diode 11*r* matches the target output intensity p2, and the illumination control unit 91 drives the light-emitting diode 11*r* at the control value d2. When the current output intensity (=p2) is raised to the target output intensity p1 after being set or after being changed, the illumination control unit 91 can drive the light-emitting diode 11*r* at the increased control value (>d1). Specifically, when the control unit stores therein a control value corresponding to a target output intensity, the control unit can drive the light source unit at a control correction value corresponding to a target output intensity higher than the target output intensity after being set or after being changed. Generally, the light-emitting diode 11*r* has a lower temperature as the target output intensity p is lower, so that the present inventors have recognized that when the current output intensity (=p2) is raised to the target output intensity p1 after being set or after being changed, the luminance of the light-emitting diode 11*r* that is driven at the control value d1 is low due to the low temperature state (amount of heat generation) of the light-emitting diode 11*r*. When the current output intensity (=p2) is raised to the target output intensity p1 after being set or after being changed, the illumination control unit 91 in FIG. 3 drives the light source unit 11 including the light-emitting diode 11*r* etc. at the increased control value (>d1), so that it is possible to accurately control the luminance of the illuminating unit 10.

When storing therein a control value corresponding to the target output intensity of the light source unit 11, the control unit 90 in FIG. 3 can store therein an assumed temperature of the light source unit 11 that is associated with the control value. For example, assumed temperatures corresponding to the control values d1 and d2 are respectively T1 and T2 (see FIG. 5). At Step ST02 in FIG. 4, it is assumed that for example, the temperature of the light-emitting diode 11*r* is T, for example, the current output intensity data P of the light-emitting diode 11*r* matches the target output intensity p1, and the illumination control unit 91 drives the light-emitting diode 11*r* at the control value d1. Specifically, when a difference between the current temperature (=T) and the assumed temperature (=T1) that is associated with the current control value (d1) corresponding to the current output intensity (=p1) is equal to or greater than a threshold (second threshold or temperature threshold), the control unit 90 can consider how far the current temperature (=T) is apart from the current assumed temperature (=T1). More specifically, the control unit 90 can compare the current temperature (=T), the current assumed temperature (=T1), and the assumed temperature T2 that is associated with the control value d2 corresponding to the target output intensity p2 after being set or after being changed with one another.

When the current temperature (=T) is apart farer from the current assumed temperature (=T1) than from the assumed temperature T2 after being set or after being changed, in other words, when T<T2<T1 is established, the control unit 90 can decrease a correction value Δ. When the current temperature (=T) is apart farer from the assumed temperature T2 after being set or after being changed than the current assumed temperature (=T1), in other words, when T2<T1<T is established, the control unit 90 can increase the correction value Δ. When the current temperature (=T) is present between the assumed temperature T2 after being set or after being changed and the current assumed temperature (=T1), in other words, when T2<T<T1 is established, the control unit 90 can decrease the correction value Δ.

At Step ST05 in FIG. 4, the control unit 90 can determine the correction value as described above. At Step ST04, when the difference between the target output intensity and the current output intensity is not equal to or greater than the threshold, the control unit 90 omits Step ST05, in other words, can set zero as the correction value. At Step ST06, the control unit 90 corrects the control value on the basis of the correction value, and the illumination control unit 91 can drive the light source unit 11 at the control correction value. After the illumination control unit 91 has driven the light source unit 11 on the basis of the control correction value, the control unit 90 can take in the current output intensity detected by the detection unit 40 (Step ST07), and can adjust the correction value such that the current output intensity matches the target output intensity (Step ST09).

As one example, the illumination control unit 91 can gradually decrease the correction value Δ such that the control correction value d2' in FIG. 5 trends toward the control value d2. The control unit 90 can adjust the correction value until the current output intensity detected in real time at Step ST07 is stabilized at the target output intensity (Step ST08). When the current output intensity is stabilized at the target output intensity, the control unit 90 can update the current output intensity (Step ST10). Specifically, the control unit 90 can employ the stabilized target output intensity as the current output intensity.

Figure 6:
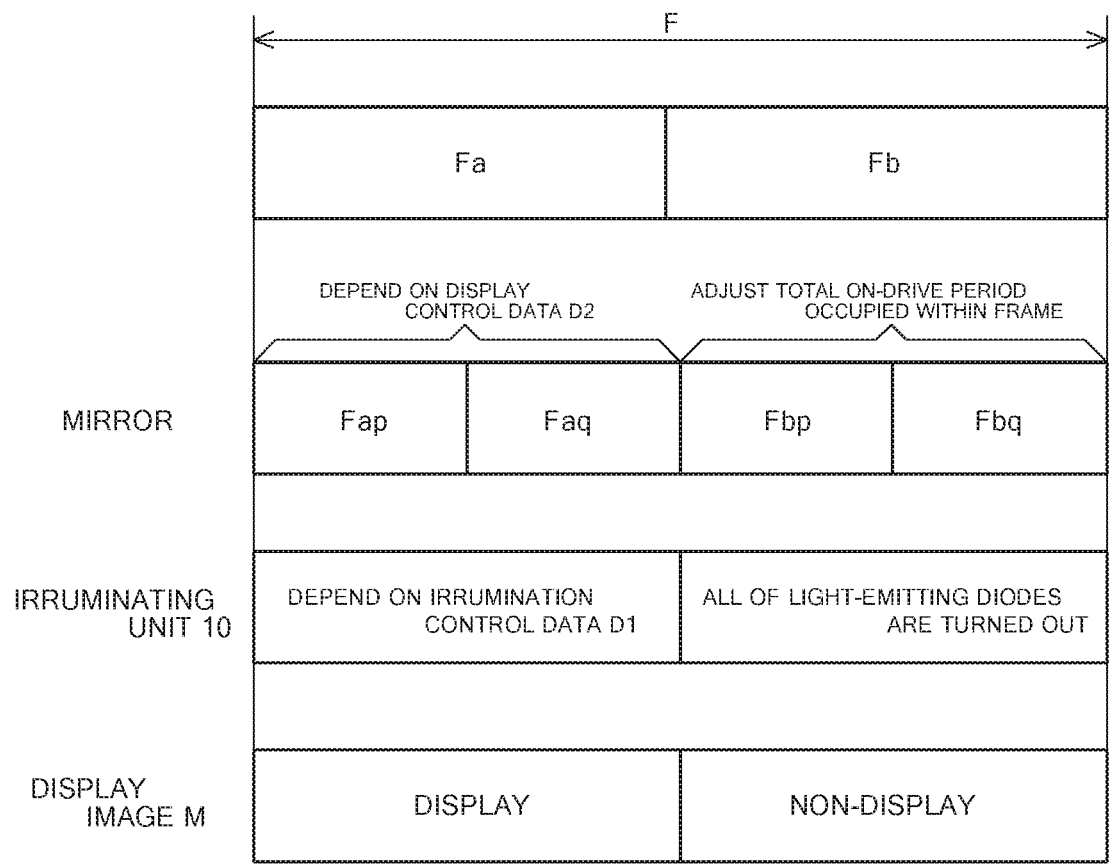
FIG. 6 is an explanation diagram of a frame that is a cycle in which a display image in FIG. 2 is displayed.

FIG. 6 is an explanation diagram of the frame F that is a cycle in which the display image M in FIG. 2 is displayed. The frame F includes a display period Fa in which the respective micro mirrors in the display element 30 are normally driven and a non-display period Fb in which the respective micro mirrors in the display element 30 are non-display period driven. The rate of the display period Fa occupied within the frame F is 50[%], for example, however, the rate is not limited to this but may be set to 70[%] or 100[%], for example. The rate of the display period Fa occupied within the frame F may be constant, or may be determined in accordance with a demanded luminance. The display period Fa is a period in which the illuminating light C from the illuminating unit 10 is projected toward the screen 60 as the display image M. The non-display period Fb is a period in which the illuminating unit 10 is turned out (for example, all of the three light-emitting diodes 11*r*, 11*g*, and 11*b* are turned out) (see FIG. 7(D) to FIG. 7(F)).

An in-display-period on-drive period Fap is a period in which the micro mirror is turned ON within the display period Fa, and an in-display-period off-drive period Faq is a period in which the micro mirror is turned OFF within the display period Fa. A non-in-display-period on-drive period Fbp is a period in which the micro mirror is turned ON within the non-display period Fb, and a non-in-display-period off-drive period Fbq is a period in which the micro mirror is turned OFF within the non-display period Fb. The control unit 90 adjusts the non-in-display-period on-drive period Fbp and the non-in-display-period off-drive period Fbq when driving the micro mirror, in order to prevent the micro mirror from being fixed, preferably, such that the sum of the in-display-period on-drive period Fap and the non-in-display-period on-drive period Fbp (total on-drive period Fp) is approximately equal to the sum of the in-display-period off-drive period Faq and the non-in-display-period off-drive period Fbq (total off-drive period Fq).

Figure 7:
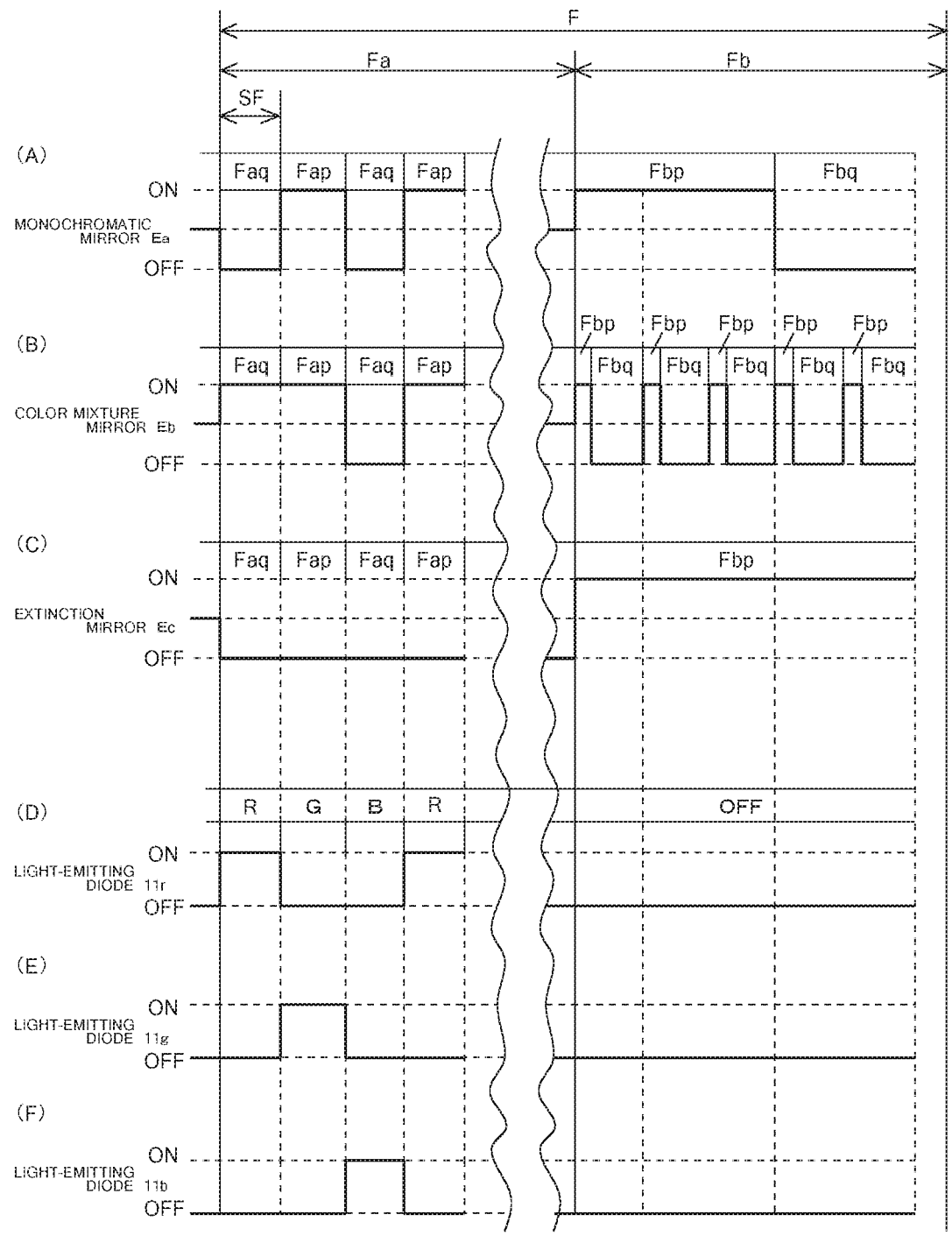
FIG. 7 is an explanation diagram of a driving method of a display element 30 and a light source unit 11 in FIG. 3.

FIG. 7 is an explanation diagram of a driving method for the display element 30 and the light-emitting unit 10 in FIG.

3. As illustrated in FIG. 7(A) to FIG. 7(C), in the frame F, the display element 30 can include, for example, a monochromatic mirror Ea that displays green color in monochrome, a color mixture mirror Eb that displays mixture color of red color and green color, and an extinction mirror Ec that displays nothing. As for the monochromatic mirror Ea, as illustrated in FIG. 7(A), the control unit 90 can adjust the non-in-display-period on-drive period Fbp and the non-in-display-period off-drive period Fbq within the non-display period Fb, on the basis of the display control data D2, such that the total on-drive period Fp that is the sum of periods in which the monochromatic mirror Ea is turned on at the lighting timing of the light-emitting diode 11g (see FIG. 7(E)) within the display period Fa and is turned ON in the frame F within the non-display period Fb is approximately a half of the frame F.

The control unit 90 can adjust, as the color mixture mirror Eb illustrated in FIG. 7(B), such that the total on-drive period Fp is approximately equal to the total off-drive period Fq by repeating ON and OFF within the non-display period Fb in a cycle in accordance with the non-in-display-period on-drive period Fbp and the non-in-display-period off-drive period Fbq. Moreover, as illustrated in FIG. 7(C), the extinction mirror Ec is off driven over the display period Fa, so that the non-display period drive is made to be ON over the non-display period Fb.

The invention is not limited to the abovementioned exemplary embodiment, and persons skilled in the art could easily change the abovementioned exemplary embodiment in a range within the scope of the claims.

INDUSTRIAL APPLICABILITY

The invention is applicable as a display device, such as a head-up display device, that is mounted on a vehicle and that allows a virtual image to be visually identified.

REFERENCE SIGNS LIST

10 . . . illuminating unit, 11 . . . light source unit, 11r, 11g, 11b . . . light-emitting diode, 20 . . . illuminating optical system, 30 . . . display element, 40 . . . detection unit, 41 . . . sensor, 42 . . . A/D converter, 50 . . . projection optical system, 60 . . . screen, 70 . . . plane mirror, 75 . . . concave mirror, 80 . . . housing, 81 . . . window unit, 90 . . . control unit, 91 . . . illumination control unit, 92 . . . display control unit, 100 . . . head-up display device (display device in a broad sense), 200 . . . window shield, 250 . . . vehicle driver, 300 . . . video signal, D1 . . . illumination control data, D2 . . . display control data, F . . . frame, L . . . display light, M . . . display image, SF . . . sub-frame, V . . . virtual image, d1, d2 . . . control value, d2' . . . control correction value, Δ . . . correction value.

The invention claimed is:

1. A display device comprising: an illuminating unit that includes a light source unit capable of emitting light; an illumination control unit that controls the illuminating unit; a display element that is capable of forming a display image using illuminating light from the illuminating unit; a display control unit that controls the display element; a control unit that controls the illumination control unit and the display control unit on the basis of a video signal; and a detection unit that detects a current output intensity of the light source unit, wherein the control unit stores therein a control value corresponding to a target output intensity of the light source unit, the control unit determines, on the basis of a difference between the target output intensity and the current output intensity detected by the detection unit, a correction value for correcting the control value, and the illumination control unit drives the light source unit on the basis of a control correction value in which the control value is corrected by the correction value; and wherein when the target output intensity is lower than the current output intensity, the correction value decreases the control value.

2. The display device according to claim 1, wherein when the target output intensity is higher than the current output intensity, the correction value increases the control value.

3. The display device according to claim 1, wherein as an absolute value of the difference between the target output intensity and the current output intensity detected by the detection unit is greater, an absolute value of the correction value is greater.

4. The display device according to claim 1, wherein when an absolute value of the difference between the target output intensity and the current output intensity detected by the detection unit is less than a threshold, the correction value is zero, and the control correction value is the control value corresponding to the target output intensity.

5. The display device according to claim 1, wherein the control unit takes in the current output intensity detected by the detection unit after having driven the light source unit on the basis of the control correction value, and adjusts the correction value such that the current output intensity matches the target output intensity.

6. The display device according to claim 1, wherein the light source unit includes a plurality of light-emitting elements respectively having different light-emitting colors, the illumination control unit controls the illuminating unit by a field sequential method so as to drive the light-emitting elements individually for each of sub-frame periods obtained by temporally dividing a frame period of the image, the control unit stores therein the control value corresponding to the target output intensity for each of the light-emitting elements, and the control value is based on a product of a duty ratio for PWM driving corresponding one light-emitting element of the plurality of light-emitting elements and a current value for PAM driving the corresponding one light-emitting element.

7. The display device according to claim 1, wherein the detection unit further detects a current temperature of the light source unit, and the control unit determines the correction value on the basis of the difference between the target output intensity and the current output intensity, and the current temperature.

8. The display device according to claim 1, wherein the control unit stores therein an assumed temperature of the light source unit that is associated with the control value, and the control unit determines the correction value on the basis of the difference between the target output intensity and the current output intensity, the current temperature, a first assumed temperature that is associated with a current control value, and a second assumed temperature that is associated with a target control value corresponding to the target output intensity.

* * * * *